Oct. 8, 1963    H. J. EMMEL    3,106,031
SLIDE CHANGING MECHANISM FOR SLIDE PROJECTORS
Filed Sept. 29, 1961    2 Sheets—Sheet 2

INVENTOR.
HENRY J. EMMEL
BY Frank C. Parker
ATTORNEY

United States Patent Office 3,106,031
Patented Oct. 8, 1963

---

3,106,031
SLIDE CHANGING MECHANISM FOR SLIDE PROJECTORS
Henry J. Emmel, Irondequoit, N.Y., assignor to Bausch & Lomb Incorporated, Rochester, N.Y., a corporation of New York
Filed Sept. 29, 1961, Ser. No. 141,847
3 Claims. (Cl. 40—79)

This invention relates generally to projectors for picture slides and more particularly relates to the slide changing mechanism therefor whereby successive slides may be exhibited.

It is an object of this invention to provide a novel slide changing mechanism for a slide projector, said mechanism being entirely manually operated and being simple and rugged in structure and reliable in operation.

A further object is to provide such a mechanism at least cost, said mechanism including therein means for operating a shutter in timed relation thereto and means for regulating said timed relation.

Figure 1:
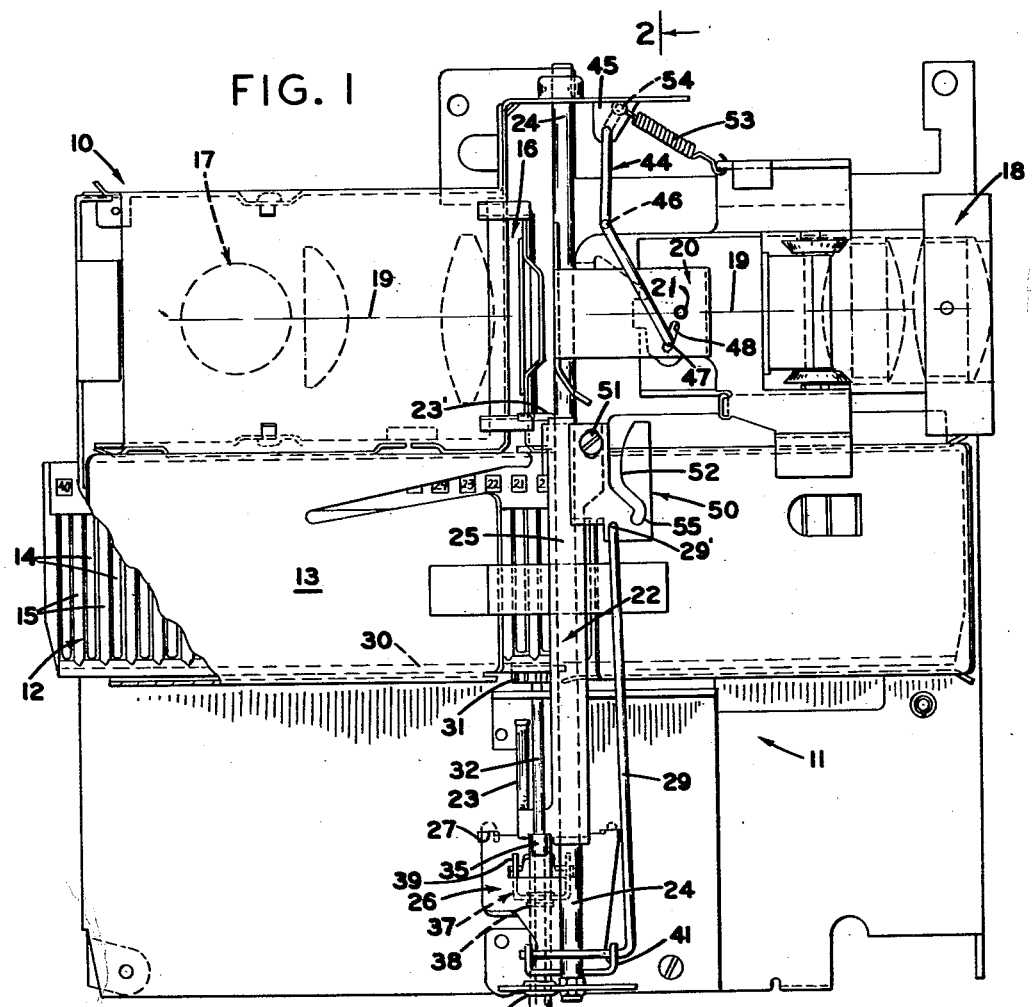
Figure 2:
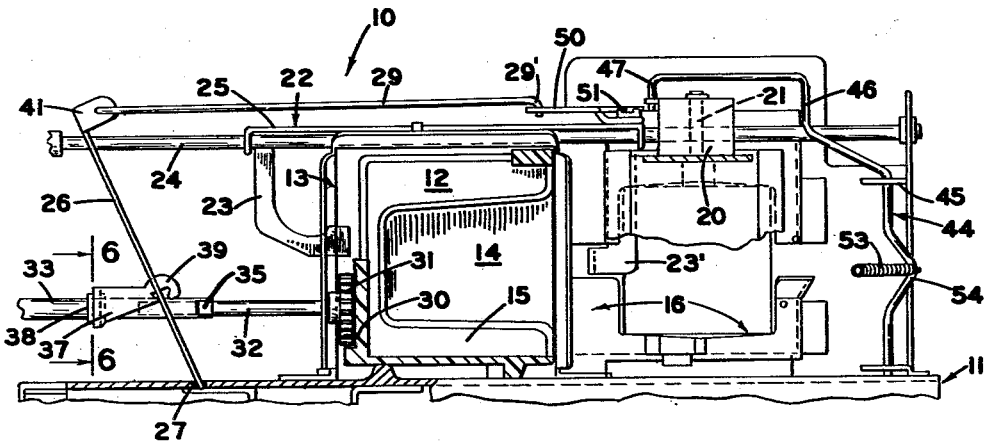
Figure 3:
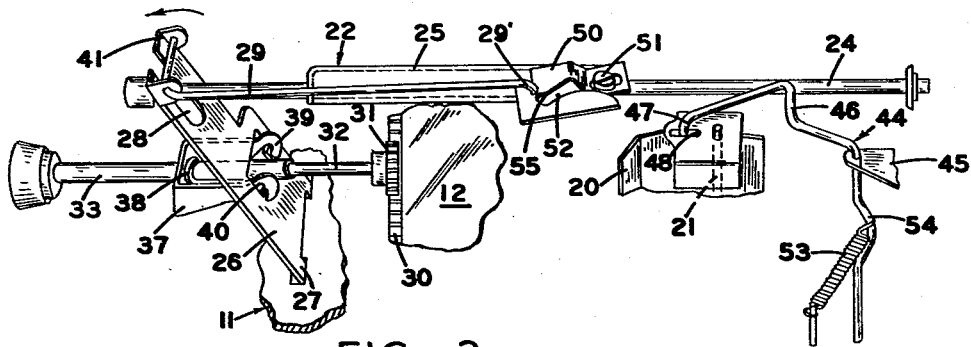
Figure 4:
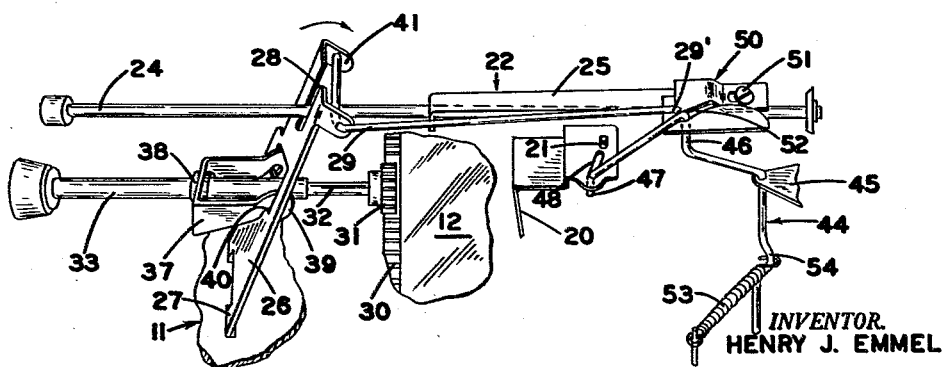

Further objects and advantages will be found in the combination and detailed arrangement and construction of the component parts of this invention by reference to the specification herebelow taken together with the accompanying drawings wherein, FIG. 1 is a plan view of a slide projector embodying one form of the present invention, FIG. 2 is a sectional view, partly broken away, taken on the line 2—2 of FIG. 1, FIG. 3 is a skeletonized perspective view of the operating parts of this invention shown in one operative position, FIG. 4 is a view similar to FIG. 3 showing said parts in a different operative position, FIG. 5 is a plan view of an operating element of said projector, and FIG. 6 is a sectional view taken on the line 6—6 of FIG. 2.

In the drawings, a slide projector 10 is shown comprising a chassis 11 whereon a slide tray 12 is slidably held within a guiding tunnel structure 13. A multiplicity of slides 14 are positioned therein by septums 15, the space therebetween being open to permit said slides to be moved laterally out of said tray and into a slide gate 16 which is located immediately laterally adjacent thereto. On one side of said gate 16, illumination means generally designated by numeral 17 are provided for the slides 14 and on the opposite side thereof a suitable projection lens 18 is aligned on an optical axis 19 whereon the illumination means 17, gate 16 and lens 18 are all optically aligned. A rotatable shutter mechanism 20 is pivotally mounted on a vertical shaft 21 in such a location that the projected picture may be occluded by swinging motion of the shutter.

Transversely of slide tray 12, a slide shifter 22 is provided having slide contacting arms 23 and 23' thereon for engagement with opposite sides of the slides 14. The shifter 22 is supported by and beneath an elongated bar 24 whereon it is slidably fitted for travel into and out of the slide tray 12 and the slide gate 16. Said bar 24 is secured at its opposite ends in any preferred manner to elements of the chassis 11 which position the bar above the tunnel structure 13 normal to the tray 12. Preferably the slide shifter 22 comprises a reinforcing flange or rib 25 extending parallel to bar 24.

According to this invention, slide changing mechanism is provided for the slides 14 comprising a shift lever 26 which is preferably pivotally held at pivot 27 in the chassis 11 in a position at the opposite side of the tunnel from the slide gate so as to swing in a substantially vertical plane in the direction of the bar 24. Said lever 26 preferably reaches upwardly across the support bar 24, the end of said lever having a slot 28 formed longitudinally thereof which closely fits and straddles said bar and serves to control side sway in the swinging motion of said lever along the bar. At the upper end of the shift lever 26, a stiff connecting link 29 is pivotally secured, said link serving as a positive connection for moving said slide shifter 22 to which it is swivelly connected at 29' in any preferred manner such as the structure shown in the drawing.

For indexing or advancing the slide tray 12 longitudinally from one slide position to the next, a rack 30 is provided on a longitudinal side of said tray and a spur gear 31 is meshed therewith. An indexing shaft 32 is suitably rotatably carried by the chassis 11 and said gear 31 is fixed thereto whereby rotation thereof effects said indexing of the tray 12.

The other end of the indexing shaft 32 opposite to gear 31 is slidably held coaxially in a tubular lever operating sleeve 33, the outer end of the sleeve being slidably and rotationally journalled in chassis 11 by means of bearing 34 which is fixed in said chassis. At the inner end of sleeve 33, a rotational and relatively slidable connection is made to the indexing shaft 32 by any preferred means such as the flattened and indented wall section 35 of the sleeve which engages slidably against an elongated flat part 36 formed on the indexing shaft 32 as shown in FIG. 6.

Intermediate of the ends of the operating sleeve 33, a protractive and retractive connection is provided between said sleeve and the shift lever 26 by any preferred mechanism such as a rigid U-shaped transmission member 37. Said member is swivelly loosely connected to said sleeve in any preferred manner such as the swivel joint 38 so that the other ends of the bifurcated transmission member may be swung vertically somewhat. At said other ends, the bifurcated extensions of the transmission member 37 have suitable hook-like formations 39 formed thereon which engage over the lower edge of corresponding opening 40 in the shift lever 26 so as to apply force alternatively to the front and back surfaces thereof to swing the lever upon movement of the sleeve.

At the free swinging end 41 of the shift lever 26, the aforesaid stiff link 29 is hinged in any preferred manner such as the swivel joint shown in the drawings, the other end of said link being swivelly connected to the slide shifter at 29' whereby axial motion of the operating sleeve 33 causes reciprocation of said shifter.

A further novel feature resides in means for actuating the aforesaid shutter mechanism 20, said means comprising a bent lever 44 which is pivotally mounted in a bracket 45 and is provided with a first vertical offset portion 46 and a second vertical offset portion 47. The second offset portion 47 engages in a suitable end closed cam slot 48 formed in an element of said shutter mechanism 20 in such a manner that the swing of lever 44 serves to move said shutter between occluding and non-occluding positions in front of the lens 18 about the axis 21.

A turning force is applied to the lever 44 in timed relation to the reciprocation of the slide shifter 22 by an operating plate 50 which is fixed by any preferred means such as the screw 51 to the reinforcing flange 25 of said shifter and is provided with an operating cam 52. Said cam is open ended and flared at one end to provide easy entry and engagement of the first vertical offset portion 46 of the bent lever 44 and said cam is so angularly formed on the plate 50 that a small amount of the final motion of the shifter toward said shutter causes the cam 52 to engage the lever 44 and open the shutter. The return motion of the bent lever 44 is supplied by suitable spring 53 which is attached to a crank type offset 54 formed therein, the other end of said spring being attached to a nearby stationary element of said chassis 11.

An advantageous anti-rebound feature is provided for the slide shifter 22 by forming a hook-like re-entrant curve 55 in the inner and closed end of the cam slot 52 in the operating plate 50 as shown best in FIG. 5. The re-entrant part 55 of the cam 52 forms a pocket into which the first vertical offset portion 46 of the bent lever 44 drops at the instant that the shifter 22 comes to rest, the portion 46 being yieldably held therein by the spring 53 with a force sufficient to dampen the tendency to rebound.

A steepness of the cam surface 56 of any desired degree may be provided so that the rebounding of the shifter 22 is effectively counteracted without unduly adding resistance to the manual effort required for the return movement thereof.

Another useful feature is obtained by making the anchorage for the operating plate 50 in the form of a single screw 51. In this way the plate is adjustably mounted to pivot about the screw so that the angular motion of the bent lever 44 and consequently the coordinated movements of the shifter 22 and shutter 20 may be regulated without appreciably changing the "slide exposure" position of the shifter.

It will be observed from the foregoing description that the disclosed slide changing mechanism is extremely simple in structure and inexpensive to manufacture but nevertheless is easy and reliable to operate and is uncomplicated and open in structure so as to be easily adjusted and serviced.

Although only a single embodiment of this invention has been shown and described in detail, other forms and embodiments are possible and changes and substitutions may be made in its operating parts without departing from the spirit of the invention as defined in the claims herebelow.

What is claimed is:

1. In a slide changing mechanism for a slide projector having a slide tray from which slides are successively withdrawn for exhibition in a slide gate and having a chassis in which the tray is longitudinally slidably mounted, said mechanism further having a support bar which is fixed in a position normal to and above said tray and a slide shifter which is slidably mounted on said bar to move a slide from said tray to said slide gate, and an indexing shaft rotatably carried by the chassis in a position higher than the bottom of said tray and parallel to said bar, a rack and gear connection between said shaft and tray, the combination of a shift lever pivotally mounted at one end to swing in a vertical plane parallel to said bar, an operating plate fixed to said shifter, a stiff connecting link swivelly connected at its opposite ends to the free end of the lever and to said operating plate respectively, and an operating sleeve non-rotatably and slidably fitted onto said shaft and journaled for rotational and axial movements in said chassis, a protractive and retractive connection operatively constructed between said sleeve and lever to swing the lever upon axial movement of said sleeve, whereby the slide shifter is moved back and forth by axial movements of said sleeve and the tray is advanced by rotation thereof.

2. In a slide changing mechanism for a slide projector having a slide tray from which slides are successively withdrawn for exhibition in a slide gate and further having a chassis wherein the tray is longitudinally slidably mounted, said mechanism comprising a support bar carried transversely above said tray by said chassis, a slide shifter reciprocably mounted on said bar, means for moving said shifter reciprocably, the improvement consisting of an operating plate fixed to said shifter, said plate having a part including cam means operatively positioned to engage a shutter operating member near the end of the travel of said shifter and open the shutter.

3. A slide changing mechanism as set forth in claim 2 further characterized by said cam means consisting of two opposed surfaces which confine said shutter operating member and provide on open ended slot having a terminal hook-like re-entrant portion wherein an element of said shutter operating member may be resiliently held to prevent rebounding thereof, and spring means operatively connected to said actuating means to releasably hold said element in said re-entrant portion.

References Cited in the file of this patent

UNITED STATES PATENTS

| | | |
|---|---|---|
| 2,724,989 | Badalich | Nov. 29, 1955 |
| 2,938,288 | Wallin | May 31, 1960 |
| 2,949,814 | Boughton et al. | Aug. 23, 1960 |
| 2,978,823 | Wiklund | Apr. 11, 1961 |
| 2,999,425 | Emmel | Sept. 12, 1961 |